United States Patent
Chen

(10) Patent No.: US 11,548,110 B2
(45) Date of Patent: Jan. 10, 2023

(54) ANGLE HEAD HOLDER

(71) Applicant: SHIN-YAIN INDUSTRIAL CO., LTD., Taichung (TW)

(72) Inventor: Pen Hung Chen, Taichung (TW)

(73) Assignee: SHIN-YAIN INDUSTRIAL CO., LTD., Taichung (TW)

( * ) Notice: Subject to any disclaimer, the term of this patent is extended or adjusted under 35 U.S.C. 154(b) by 161 days.

(21) Appl. No.: 17/144,571

(22) Filed: Jan. 8, 2021

(65) Prior Publication Data

US 2022/0219271 A1 Jul. 14, 2022

(51) Int. Cl.
*B23Q 5/04* (2006.01)
*B23B 29/12* (2006.01)

(52) U.S. Cl.
CPC .............. *B23Q 5/043* (2013.01); *B23B 29/12* (2013.01)

(58) Field of Classification Search
CPC .............. B23Q 5/045; B23Q 2230/002; B23Q 2230/008; B23C 9/005
USPC ........................................ 409/215, 230, 144
See application file for complete search history.

(56) References Cited

U.S. PATENT DOCUMENTS

| | | | | |
|---|---|---|---|---|
| 5,697,739 A * | 12/1997 | Lewis | ................ | B23Q 11/1023 409/230 |
| 7,563,062 B1 * | 7/2009 | Chen | ..................... | B23Q 5/045 408/124 |
| 8,128,323 B2 * | 3/2012 | Conroy | .............. | B23Q 11/1015 409/230 |
| 2008/0093094 A1 * | 4/2008 | Bryan | ...................... | B23Q 5/06 409/230 |
| 2013/0190153 A1 * | 7/2013 | Dodds | .................. | B23Q 1/0036 483/31 |
| 2014/0018219 A1 * | 1/2014 | Dodds | .................. | B23Q 1/0036 483/19 |
| 2014/0271014 A1 * | 9/2014 | Satou | ..................... | B23Q 16/06 409/144 |
| 2015/0209925 A1 * | 7/2015 | Dodds | ................ | B23Q 3/15733 483/18 |

FOREIGN PATENT DOCUMENTS

| JP | 4565199 B1 * | 10/2010 | .......... B23Q 16/021 |
|---|---|---|---|
| JP | 3183660 U * | 5/2013 | ............. B23B 29/04 |

* cited by examiner

*Primary Examiner* — Alan Snyder
(74) *Attorney, Agent, or Firm* — Rabin & Berdo, P.C.

(57) ABSTRACT

An angle head holder is installed on a spindle having a positioning block mounted on its outer surface with a constraining groove. The angle head holder includes a body base, a driving shaft, a holder assembly, and a positioning device. The driving shaft and the holder assembly are disposed in the body base. The positioning device has a fixing ring and an adjusting assembly. The fixing ring is sleeved on the body base and has a receiving slot. The adjusting assembly has a connecting block, a positioning pin, and at least one lever pin. The connecting block is mounted to the fixing ring and has a receiving groove. The positioning pin protrudes out of the receiving groove, is limited by the constraining groove, and has a retaining groove. The at least one lever pin is mounted in the receiving slot and the retaining groove.

5 Claims, 8 Drawing Sheets

ANGLE HEAD HOLDER

BACKGROUND OF THE INVENTION

1. Field of the Invention

The present invention relates to an angle head holder, and more particularly to an angle head holder that can provide a distance-adjusting effect to a positioning pin thereof and a spindle.

2. Description of Related Art

A conventional angle head holder includes a body base, a driving shaft, a holder assembly, and a positioning device. The driving shaft is disposed in the body base. The holder assembly is rotatably disposed in the body base and is driven to rotate by the driving shaft. An included angle is formed between an axial direction of the holder assembly and an axial direction of the driving shaft. The positioning device has a fixing ring and a positioning pin. The fixing ring is sleeved on the body base and has a receiving groove. The positioning pin is mounted in the receiving groove of the fixing ring and has an engaging block protruding from an outer surface of the positioning pin. The engaging block of the positioning pin is engaged in the body base.

When the conventional angle head holder is in use, the driving shaft is installed on a spindle of a machine tool. The spindle has a positioning block mounted on its outer surface, and the positioning block has a constraining groove. The positioning pin of the positioning device is limited by the constraining groove of the positioning block. When the machine tool is activated, the driving shaft is driven to rotate by the spindle. Since the positioning pin of the positioning device is limited by the constraining groove and the engaging block of the positioning pin is engaged in the body base, the body base will not rotate while the driving shaft is rotating.

However, the diameter of a spindle of a machine tool differs from that of a spindle of another machine tool. Since a distance between the positioning pin of the positioning device of the conventional angle head holder and a center of the spindle is unchangeable, the only way to keep the positioning pin of the positioning device limited by the constraining groove of the positioning block is by changing the positioning device according to the diameter of the spindle of the machine tool that is in use. To allow a user to mount a suitable positioning device on the body base of the conventional angle head holder, multiple positioning devices of different specifications should be prepared, which increases the cost in manufacture.

To overcome the shortcomings of conventional angle head holder, the present invention tends to provide an angle head holder to mitigate or obviate the aforementioned problems.

SUMMARY OF THE INVENTION

The main objective of the present invention is to provide an angle head holder that can provide a distance-adjusting effect to a positioning pin thereof and a spindle.

The angle head holder in accordance with the present invention is installed on a spindle having a positioning block mounted on its surface with a constraining groove. The angle head holder includes a body base, a driving shaft, a holder assembly, and a positioning device. The driving shaft is disposed in the body base and is mounted to the spindle. The holder assembly is rotatably disposed in the body base and is driven to rotate by the driving shaft. An included angle is formed between an axial direction of the holder assembly and an axial direction of the driving shaft.

The positioning device has a fixing ring and an adjusting assembly. The fixing ring is sleeved on the body base and has a receiving slot formed thereon. The adjusting assembly has a connecting block, a positioning pin, and at least one lever pin. The connecting block is detachably mounted to the fixing ring and has a receiving groove formed therein. The positioning pin is mounted in the receiving groove of the connecting block, protrudes out of one of two ends of the receiving groove, and has a retaining groove communicating with the receiving slot of the fixing ring via the receiving groove of the connecting block. The at least one lever pin is detachably mounted in the receiving slot of the fixing ring and the retaining groove of the positioning pin. A distance between the connecting block and the fixing ring is adjustable. A section of the positioning pin protruding out of the receiving groove is limited by the constraining groove of the positioning block.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
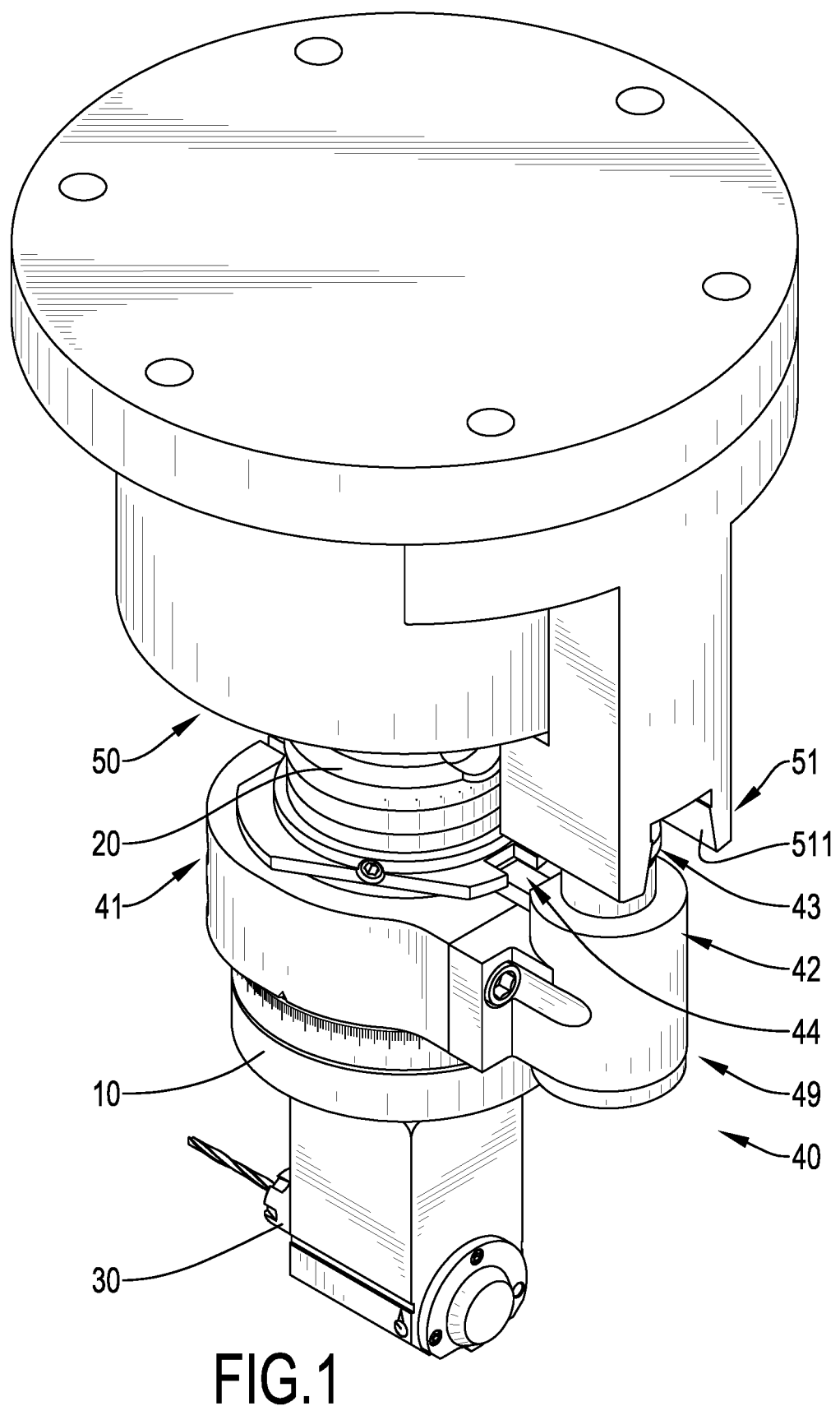
FIG. 1 is a perspective view of an angle head holder in accordance with the present invention.
Figure 2:
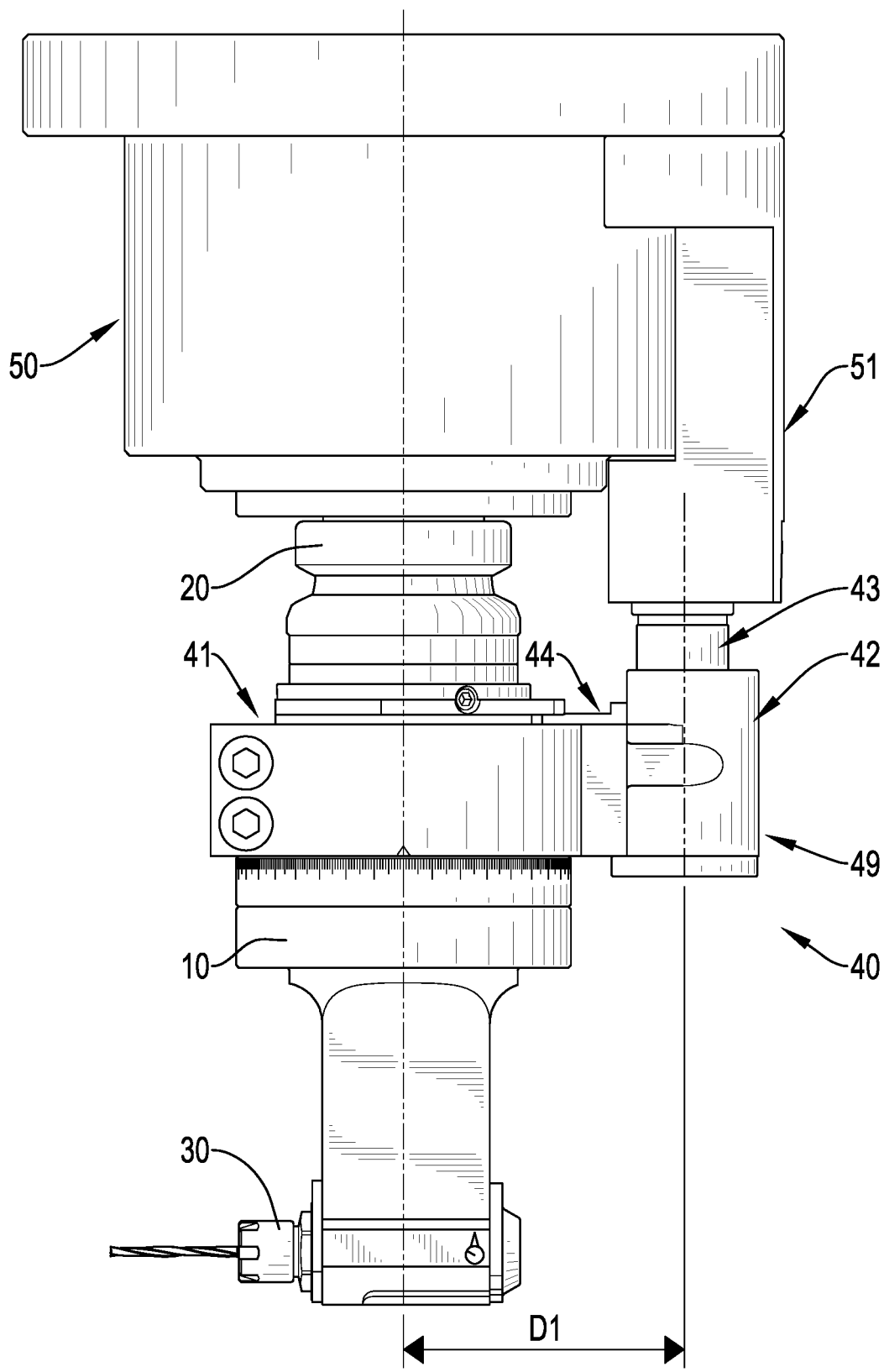
FIG. 2 is a front side view of the angle head holder in FIG. 1.

With reference to FIGS. 1 and 2, an angle head holder in accordance with the present invention includes a body base 10, a driving shaft 20, a holder assembly 30, and a positioning device 40. The angle head holder is installed on a spindle 50 when the angle head holder is in use. The spindle 50 has a positioning block 51 mounted on its outer surface, and the positioning block 51 has a constraining groove 511 recessed on its bottom.

With reference to FIGS. 1 and 2, the driving shaft 20 is disposed in the body base 10. When the angle head holder is in use, the driving shaft 20 is mounted to the spindle 50. The holder assembly 30 is rotatably disposed in the body base 10, and an included angle is formed between an axial direction of the holder assembly 30 and an axial direction of the driving shaft 20. In use, the holder assembly 30 is driven to rotate by the driving shaft 20. Since the structural relationship between the driving shaft 20 and the holder assembly 30 and how the driving shaft 20 drives the holder assembly 30 to rotate are prior art, detailed description thereof is omitted.

With reference to FIGS. 2 to 5, the positioning device 40 has a fixing ring 41 and an adjusting assembly 49. The fixing ring 41 is sleeved on the body base 10 and has a receiving slot 411 formed thereon. The adjusting assembly 49 has a connecting block 42, a positioning pin 43, at least one lever pin 44, a positioning rod 45, an end cap 46, and an elastic element 47. The connecting block 42 is detachably mounted to the fixing ring 41 and has a receiving groove 421 formed therein. A distance between the connecting block 42 and the fixing ring 41 is adjustable. In the present invention, the receiving groove 421 is disposed through the connecting block 42. The positioning pin 43 is mounted in the receiving groove 421 of the connecting block 42. The positioning pin 43 protrudes out of one of two ends of the receiving groove 421 adjacent to the constraining groove 511 of the positioning block 51, and a section of the positioning pin 43 protruding out of the receiving groove 421 is limited by the constraining groove 511.

The positioning pin 43 has a retaining groove 431 and a positioning groove 432. The retaining groove 431 is radially formed in the positioning pin 43, is located in the receiving groove 421 of the connecting block 42, is aligned with the receiving slot 411 of the fixing ring 41, and communicates with the receiving slot 411. Furthermore, the retaining groove 431 is disposed through the positioning pin 43. The positioning groove 432 is formed in one of two ends of the positioning pin 43 away from the constraining groove 511 along an axial direction of the positioning pin 43 and communicates with the retaining groove 431. In other embodiments, the positioning pin 43 may be integrally formed on the connecting block 42, and the retaining groove 431 may be disposed through the connecting block 42 and the positioning pin 43 laterally, be aligned with the receiving slot 411, and communicate with the receiving slot 411.

Figure 3:
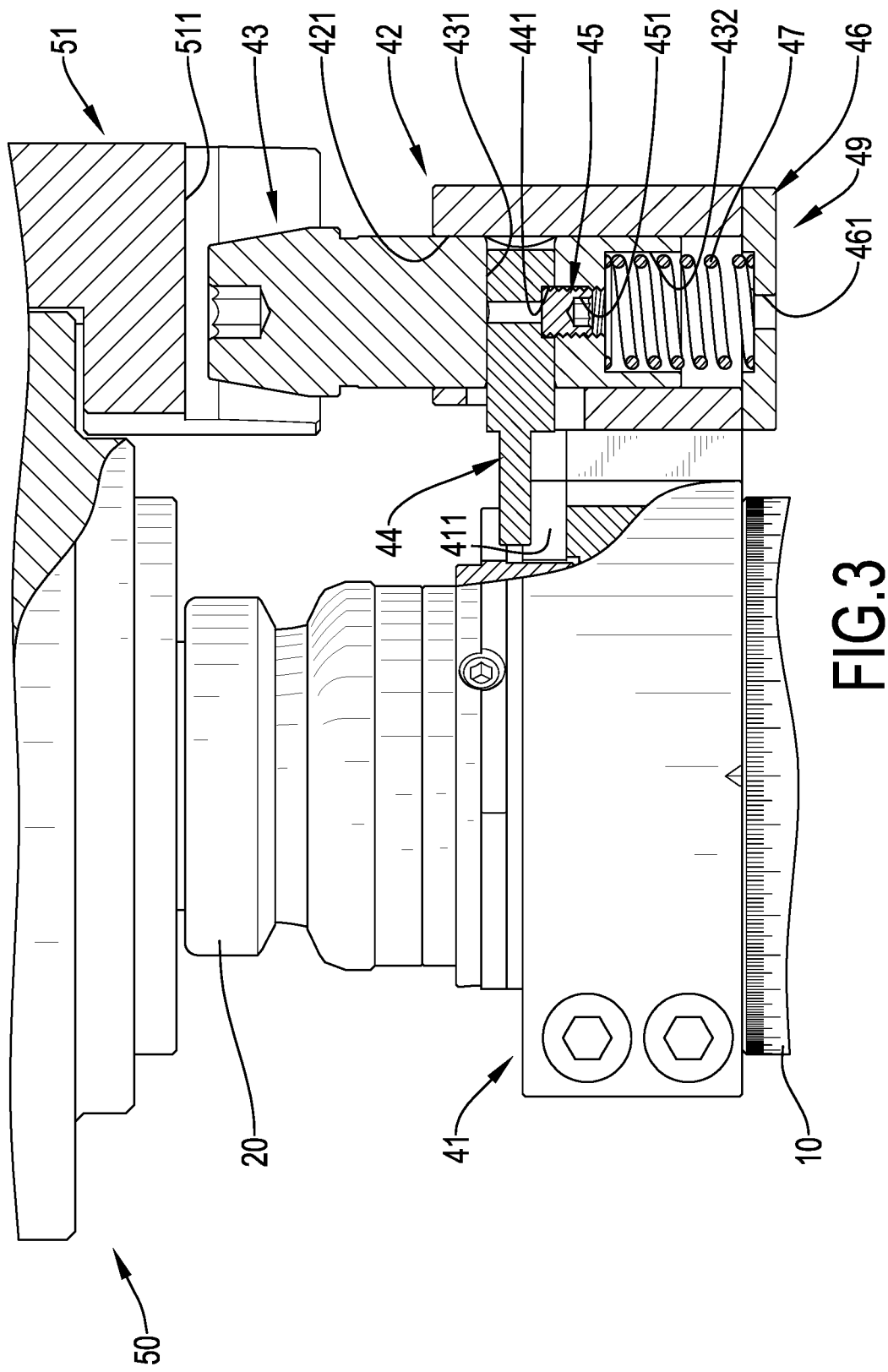
FIG. 3 is an enlarged front side view in partial section of the angle head holder in FIG. 1.
Figure 4:
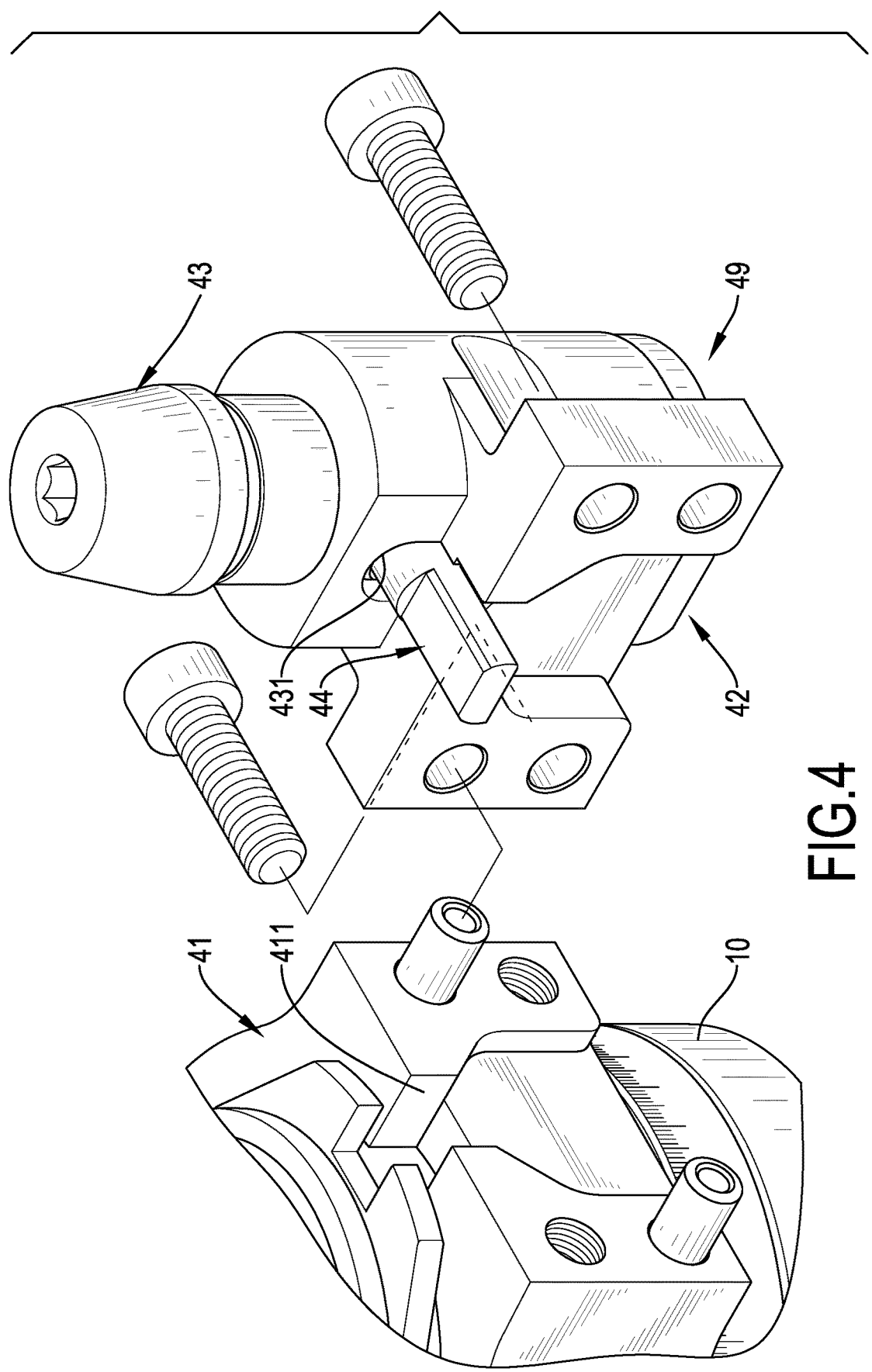
FIG. 4 is an enlarged and exploded perspective view of the angle head holder in FIG. 1.
Figure 5:
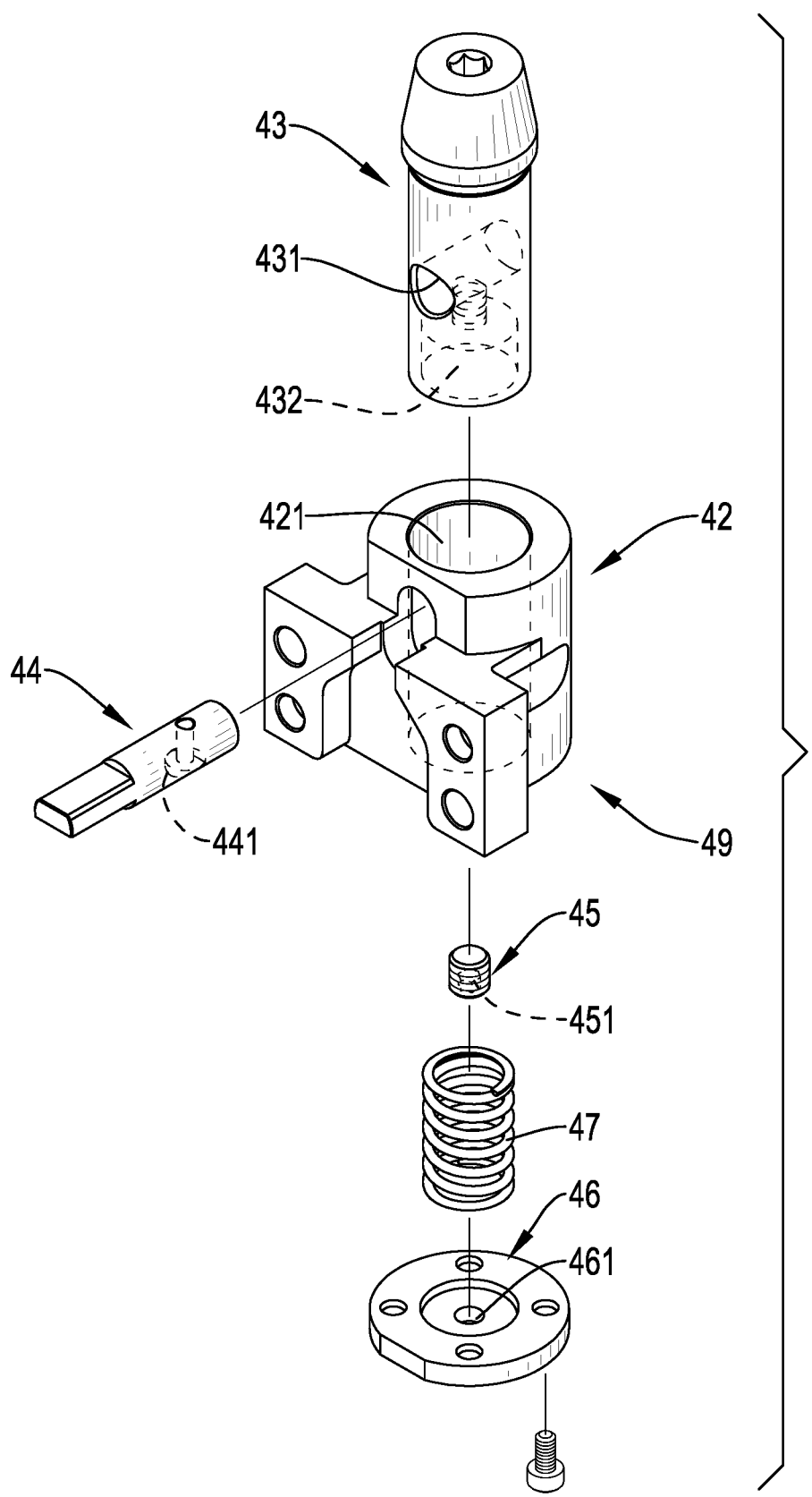
FIG. 5 is an exploded perspective view of an adjusting assembly of the angle head holder in FIG. 1.

With reference to FIGS. 3 to 5, the at least one lever pin 44 is detachably mounted in the receiving slot 411 of the fixing ring 41 and the retaining groove 431 of the positioning pin 43 and has a limiting groove 441. The limiting groove 441 is formed on an outer surface of the at least one lever pin 44, and the limiting groove 441 communicates with the receiving groove 421 of the connecting block 42 via the positioning groove 432 of the positioning pin 43. In the present invention, the adjusting assembly 49 has multiple lever pins 44, and the multiple lever pins 44 are different from one another in length.

When the distance between the connecting block 42 and the fixing ring 41 is changed, a user can mount the at least one lever pin 44 having a length corresponding to a distance between the receiving slot 411 of the fixing ring 41 and the retaining groove 431 of the positioning pin 43 in the receiving slot 411 and the retaining groove 431. In other embodiments, the at least one lever pin 44 is retractable. In the present invention, the number and the structure of the at least one lever pin 44 are not limited. The at least one lever pin 44 capable of being mounted in the receiving slot 411 and the retaining groove 431 according to the changeable distance between the connecting block 42 and the fixing ring 41 is what the present invention is aiming to protect.

With reference to FIGS. 3 to 5, the positioning rod 45 is movably mounted in the positioning pin 43 and limits the at least one lever pin 44. In the present invention, the positioning rod 45 is threaded to the positioning groove 432 of the positioning pin 43 and extends into the limiting groove 441 of the at least one lever pin 44 to limit the at least one lever pin 44. Furthermore, the positioning rod 45 has a mounting groove 451 formed in one of two ends of the positioning rod 45 away from the constraining groove 511 of the positioning block 51. The end cap 46 is mounted to one of two ends of the connecting block 42 opposite to the section of the positioning pin 43 protruding out of the receiving groove 421 and covers the receiving groove 421 of the connecting block 42. Moreover, the end cap 46 has a through hole 461 aligned with the mounting groove 451 of the positioning rod 45.

Figure 6:
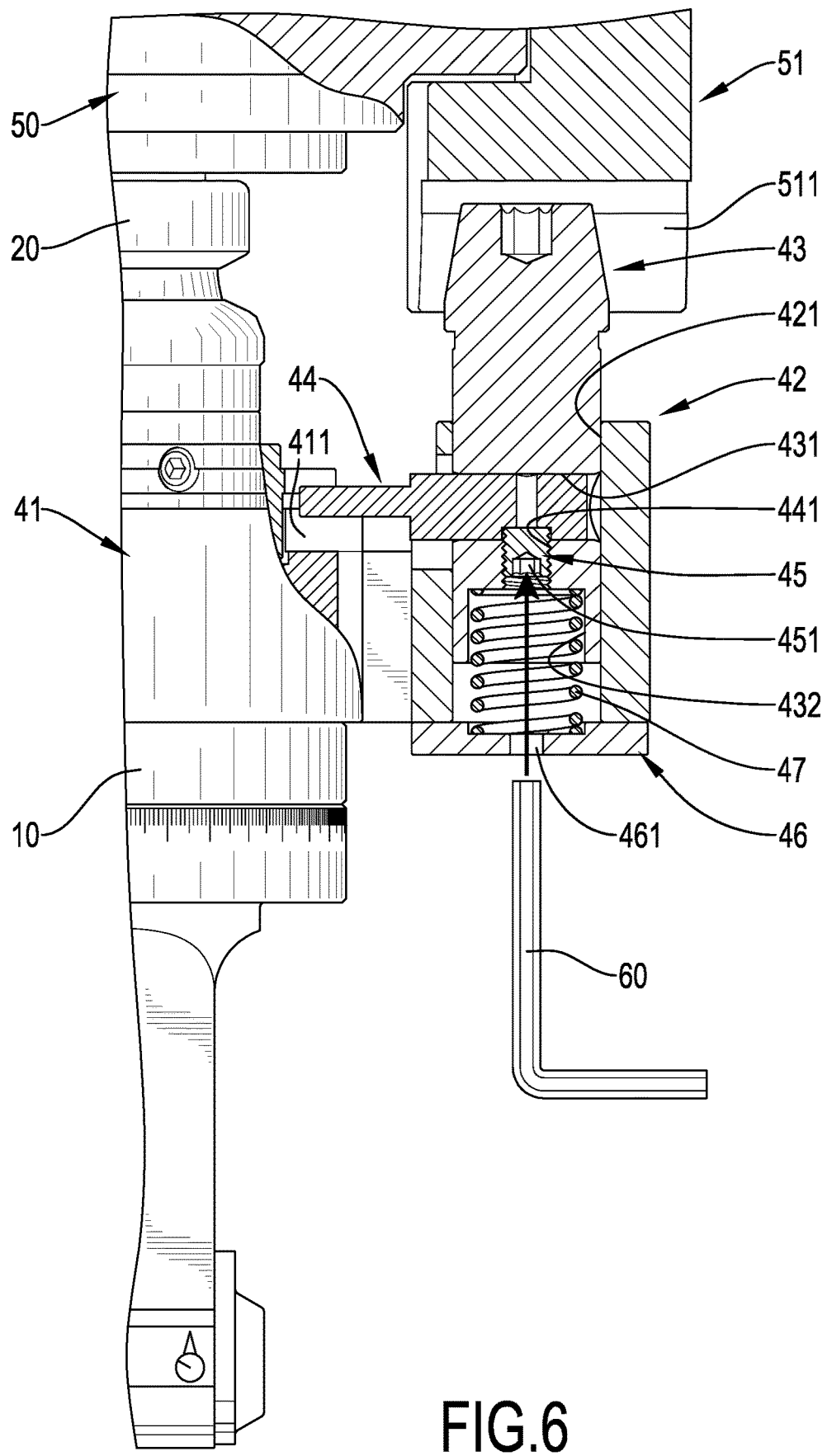
FIG. 6 is an enlarged operational front side view in partial section of the angle head holder in FIG. 1.

With such an arrangement, when the user needs to replace the at least one lever pin 44 with another lever pin 44 having a length different from that of the at least one lever pin 44 mounted in the receiving slot 411 and the retaining groove 431, the user can detach the connecting block 42 from the fixing ring 41 and insert a tool 60 such as a hexagonal wrench shown in FIG. 6 into the through hole 461 of the end cap 46 and the mounting groove 451 of the positioning rod 45 to rotate the positioning rod 45. Then, the positioning rod 45 can be separated from the positioning pin 43 and the limiting groove 441 of the at least one lever pin 44, and the positioning rod 45 does not limit the at least one lever pin 44. In such a way, the user can detach the lever pin 44 without detaching the end cap 46 from the connecting block 42, which enables the user to replace the at least one lever pin 44 in a convenient way.

With reference to FIGS. 3 and 5, the elastic element 47 has two ends. One of the two ends of the elastic element 47 abuts against the end cap 46, and the other one of the two ends of the elastic element 47 abuts against the positioning groove 432 of the positioning pin 43, such that the elastic element 47 is compressed. In the state that the elastic element 47 is compressed, the elastic element 47 exerts an upward pushing force to the positioning pin 43, which makes the positioning pin 43 remain extending into the constraining groove 511 of the positioning block 51.

Figure 7:
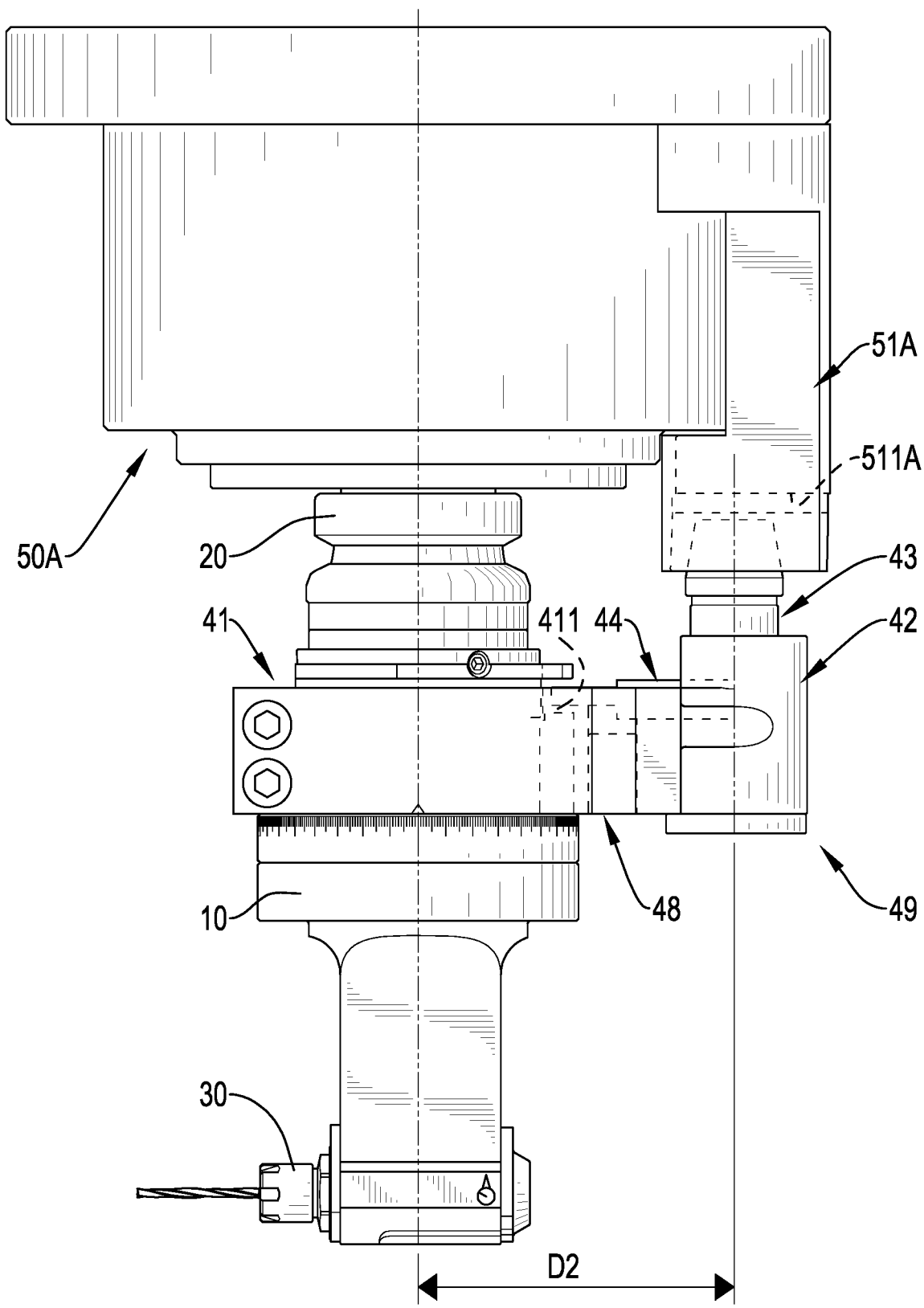
FIG. 7 is another operational front side view of the angle head holder in FIG. 1, shown with an extension block applied to the adjusting assembly.
Figure 8:
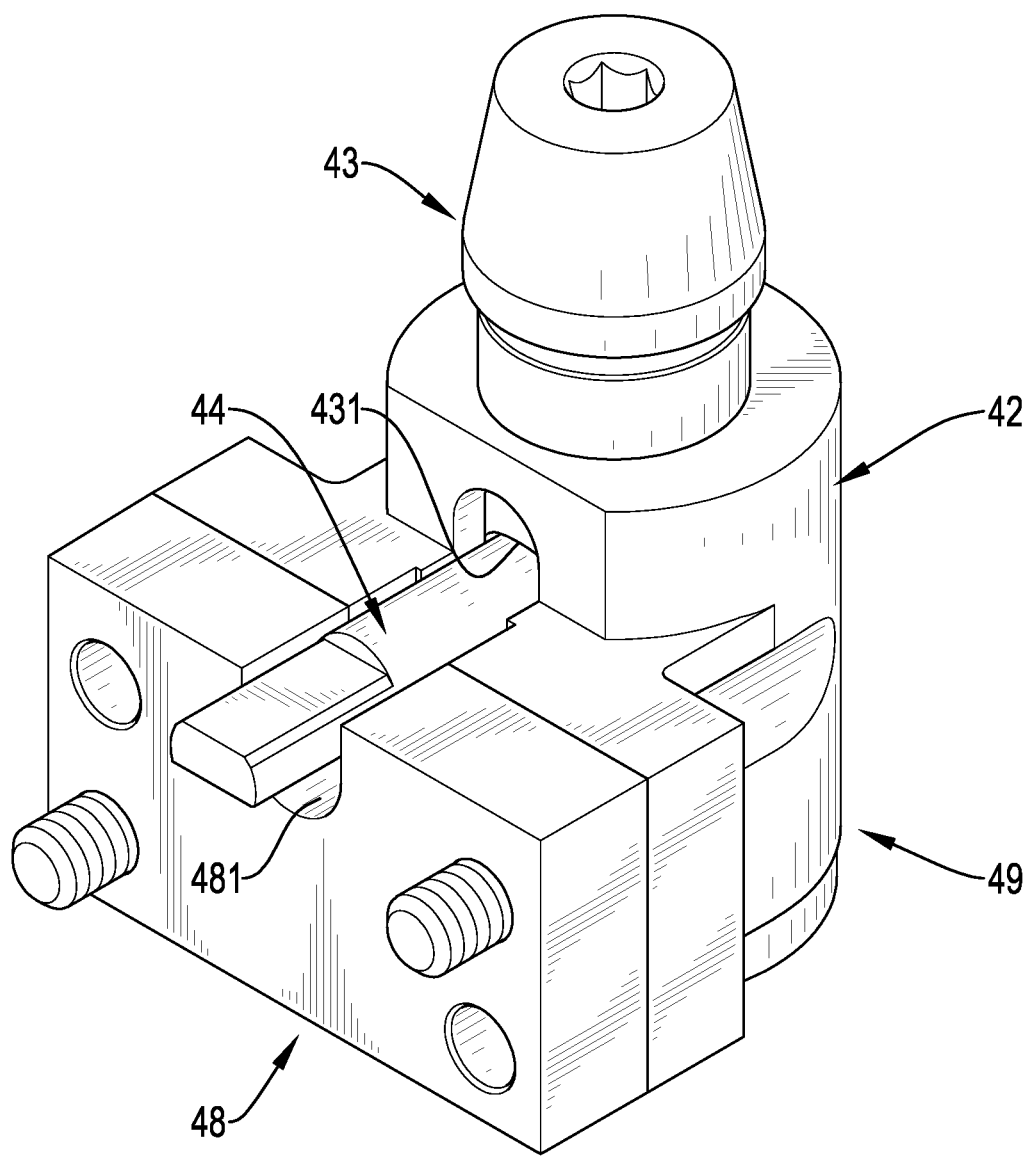
FIG. 8 is a perspective view of the adjusting assembly of the angle head holder in FIG. 7.

With reference to FIGS. 7 and 8, the adjusting assembly 49 further has at least one extension block 48. The at least one extension block 48 is mounted between the fixing ring 41 and the connecting block 42 and has a containing groove 481. The containing groove 481 is formed on a top surface of the at least one extension block 48, such that the at least one lever pin 44 can extend into the receiving slot 411 of the fixing ring 41 via the containing groove 481. With such a configuration, when the user wants to replace the at least one lever pin 44 with another lever pin 44 having a length longer than that of the at least one lever pin 44 mounted in the receiving slot 411 and the retaining groove 431, the lever pin 44 of the longer length can be supported by the at least one extension block 48.

With reference to FIGS. 2 and 7, when the user needs to install the angle head holder originally mounted to the spindle 50 as shown in FIG. 2 on the spindle 50A as shown in FIG. 7, it should be noted that a distance between the positioning block 51A and a centerline of the spindle 50A is longer than a distance between the positioning block 51 and a centerline of the spindle 50 since the spindle 50A has a diameter longer than a diameter of the spindle 50. To ensure that the positioning pin 43 can still be limited by the constraining groove 511A of the positioning block 51A, the location of the positioning pin 43 should be adjusted.

To achieve this, the user should detach the connecting block 42 from the fixing ring 41 as shown in FIG. 2, and then move the connecting block 42 to a position where the positioning pin 43 can extend into the constraining groove 511A of the positioning block 51A when mounted in the receiving groove 421 of the connecting block 42 as shown in FIG. 7. Next, mount the lever pin 44 of a suitable length in the receiving slot 411 of the fixing ring 41 and the retaining groove 431 of the positioning pin 43. Lastly, mount the at least one extension block 48 between the fixing ring 41 and the connecting block 42. In this way, a distance D1 between a centerline of the positioning pin 43 and the centerline of the spindle 50 as shown in FIG. 2 can be adjusted to a distance D2 between the centerline of the positioning pin 43 and the centerline of the spindle 50A as shown in FIG. 7, such that the positioning pin 43 can be limited in the constraining groove 511A of the positioning block 51A.

With the aforementioned technical characteristics, the angle head holder in accordance with the present invention has the following advantages.

1. Compared with the conventional angle head holder that includes the positioning device having only the fixing ring and the positioning pin mounted in the receiving slot of the fixing ring, which makes the distance between the positioning pin and the center of the spindle unchangeable, the angle head holder in accordance with the present invention includes the positioning device 40 having the adjusting assembly 49. The connecting block 42 of the adjusting assembly 49 is detachably mounted to the fixing ring 41, such that the distance between the connecting block 42 and the fixing ring 41 is adjustable.

2. After the distance between the connecting block 42 and the fixing ring 41 is adjusted, mount the lever pin 44 of a length corresponding to the distance between the receiving slot 411 of the fixing ring 41 and the retaining groove 431 of the positioning pin 43 in the receiving slot 411 and the retaining groove 431. In such a manner, a distance between the positioning pin 43 and the centerline of the spindle 50, 50A can be adjusted. With such a configuration, the positioning pin 43 can be surely limited by the constraining groove 511, 511A of the positioning block 51, 51A to prevent the body base 10 from rotating along with the driving shaft 20 and the holder assembly 30 even if the angle head holder in accordance with the present invention is installed on the spindles 50, 50A of different machine tools.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An angle head holder installed on a spindle having a positioning block mounted on its outer surface with a constraining groove, and the angle head holder comprising:
   a body base;
   a driving shaft disposed in the body base and mounted to the spindle;
   a holder assembly rotatably disposed in the body base, driven to rotate by the driving shaft, and having an axial direction forming an included angle with an axial direction of the driving shaft; and
   a positioning device having
      a fixing ring sleeved on the body base and having a receiving slot formed thereon;
      an adjusting assembly having
         a connecting block detachably mounted to the fixing ring and having a receiving groove formed therein;
         a positioning pin mounted in the receiving groove of the connecting block, protruding out of one of two ends of the receiving groove, and having a retaining groove communicating with the receiving slot of the fixing ring via the receiving groove of the connecting block; and
         at least one lever pin detachably mounted in the receiving slot of the fixing ring and the retaining groove of the positioning pin; and
      at least one extension block mounted between the fixing ring and the connecting block, the at least one extension block having a containing groove, wherein the at least one lever pin extends through the containing groove of the at least one extension block, and
         a distance between the connecting block and the fixing ring is adjustable, and a section of the positioning pin protruding out of the receiving groove is limited by the constraining groove of the positioning block.

2. The angle head holder as claimed in claim 1, wherein the adjusting assembly has multiple said lever pins, and the multiple lever pins are different from one another in length.

3. The angle head holder as claimed in claim 1, wherein the receiving groove is disposed through the connecting block; and
   the adjusting assembly has
      a positioning rod movably mounted in the positioning pin and limiting the at least one lever pin; and
      an end cap mounted to one of two ends of the connecting block opposite to the section of the positioning pin protruding out of the receiving groove and covering the receiving groove.

4. The angle head holder as claimed in claim 3, wherein the positioning rod has a mounting groove; and
   the end cap has a through hole aligned with the mounting groove of the positioning rod.

5. The angle head holder as claimed in claim 3, wherein the adjusting assembly has multiple said lever pins, and the multiple lever pins are different from one another in length.

* * * * *